(12) United States Patent
Oppelt et al.

(10) Patent No.: US 6,714,093 B2
(45) Date of Patent: Mar. 30, 2004

(54) DYNAMICS COMPRESSOR FOR AN ANALOG SIGNAL TO BE COMPRESSED

(75) Inventors: Ralph Oppelt, Uttenreuth (DE); Markus Vester, Nuremberg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/262,329

(22) Filed: Oct. 1, 2002

(65) Prior Publication Data

US 2003/0076187 A1 Apr. 24, 2003

(30) Foreign Application Priority Data

Oct. 1, 2001 (DE) .......................... 101 48 441

(51) Int. Cl.[7] .............................. H04B 1/64; H03G 7/00
(52) U.S. Cl. ......................... 333/14; 381/106; 455/72
(58) Field of Search ..................... 333/14, 17.2, 18; 381/106; 455/72

(56) References Cited

U.S. PATENT DOCUMENTS

| 4,317,142 A | * | 2/1982 | Wray | .......................... 360/67 |
| 4,730,165 A | * | 3/1988 | Nishino et al. | .............. 327/356 |
| 5,894,283 A | * | 4/1999 | Fischer et al. | .............. 341/161 |

FOREIGN PATENT DOCUMENTS

| DE | AS 28 42 945 | | 3/1981 |
| JP | 05-110366 | * | 4/1993 |

OTHER PUBLICATIONS

"Der Telefunken–Kompander," Dickopp et al., Rundfunktechnische Mitteilungen, vol. 22, No. 2, (1978)pp/ 63–74, Feb. 1978.

UKW–Berichte 2/87 (1987), pp. 74–77, Feb. 1987.

* cited by examiner

*Primary Examiner*—Barabara Summons
(74) *Attorney, Agent, or Firm*—Schiff Hardin & Waite

(57) ABSTRACT

In a dynamics compressor, an analog signal to be compressed is supplied to a first amplifier stage as an input signal, and the output signal thereof is supplied to the next amplifier stage as an input signal, and so on for a number of successive amplifier stages. Each amplifier stage amplifies its input signal with a stage amplification until it reaches a stage limit level. The analog signal and the respective output signals of the amplifier stages are summed in a summation stage to form a sum signal. Above a minimal level, the magnitude of the curve of the sum signal roughly corresponds to an exponent characteristic of the magnitude of the analog signal.

25 Claims, 2 Drawing Sheets

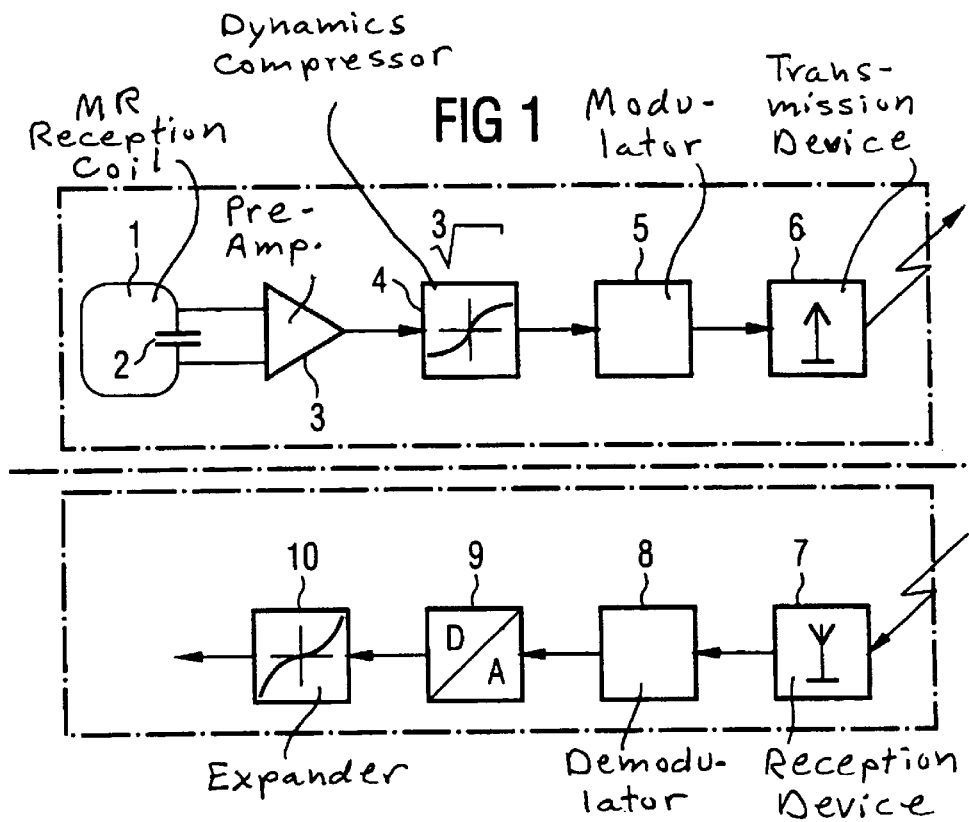
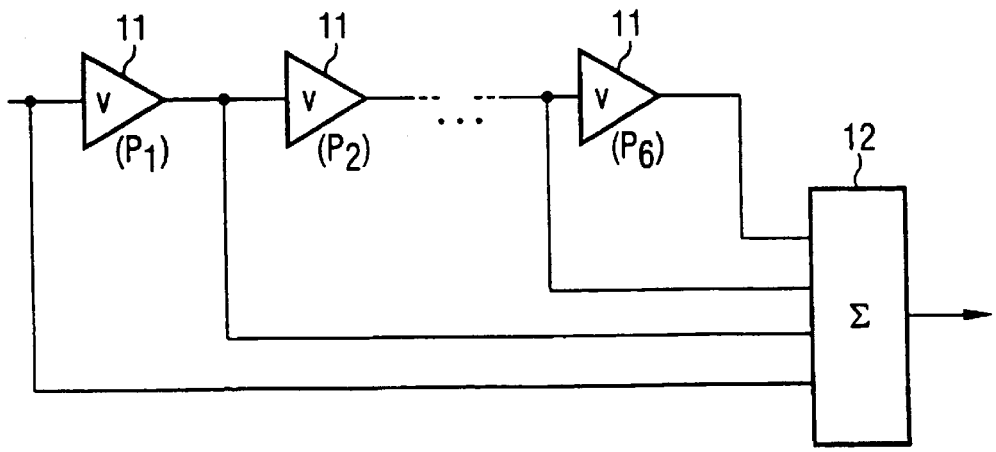

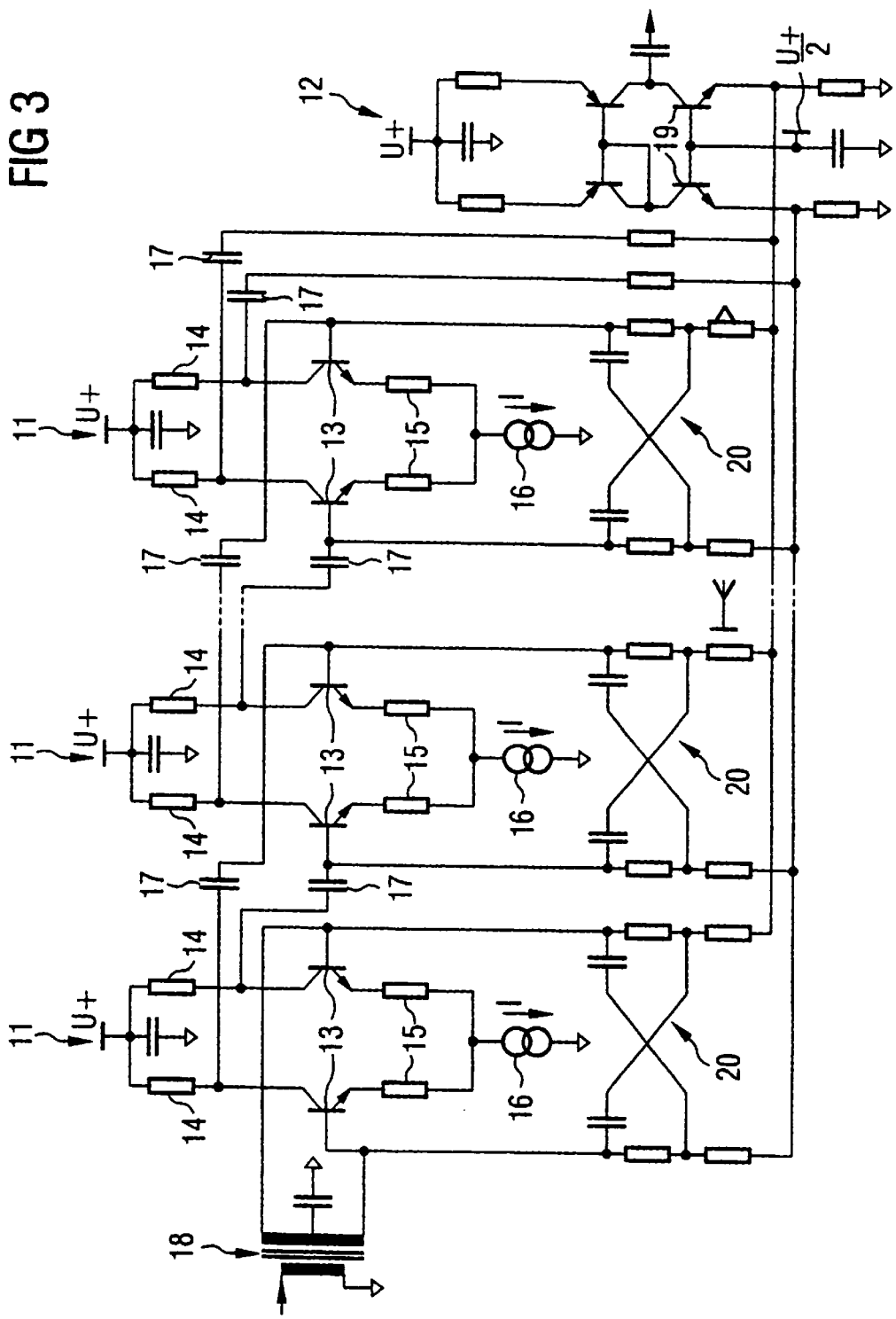

DYNAMICS COMPRESSOR FOR AN ANALOG SIGNAL TO BE COMPRESSED

BACKGROUND OF THE INVENTION

1. Field of the Invention

The present invention is directed to a dynamic compressor for an analog signal to be compressed of the type employing a number of amplifier stages connected in succession.

2. Description of the Prior Art

The range of dynamics of magnetic resonance signals is very large but their relative bandwidth on the magnetic resonance frequency level is actually rather small. A dynamic range of approximately 100 dB is typical, as is an observation bandwidth of approximately 500 kHz. Despite the relatively small bandwidth, however, the signal processing is extremely complicated because of the high dynamics demand, and thus is cost-intensive. Accepting a moderate increase in the bandwidth, the costs can be lowered by means of a suitable compression and later expansion of the magnetic resonance signals and new approaches can be considered, particularly for wireless signal readout from local coils.

The expansion of the magnetic resonance signal can ensue after the digitization of the magnetic resonance signal. The expansion therefore can be implemented with relatively little cost expenditure, for example be reprogramming a memory that is already present anyway and in which correction values are stored. The compression, by contrast, must be implemented with the analog magnetic resonance signal. High demands are made of the input dynamics, definition and reproducibility of the characteristic, phase stability, etc. Further, the power consumption of the dynamics compressor also must be low given wireless signal readout.

UKW-Berichte 2/87, pages 66 through 87, discloses a dynamics compressor of the type. In this dynamics compressor, all amplifier stages exhibit the same stage limit level and the same stage amplification. This dynamics compressor exhibits a logarithmic characteristic.

"Der Telefunken-Kompander" by Gerhard Dickopp and Ernst Schröder, which appeared in Rundfunktechnische Mitteilungen, Volume 22 (1978), No. 2, pages 63 through 74, discloses a dynamics compressor for an analog signal to be compressed that has a number of series-connected amplifier stages. The analog signal is supplied to the first of the amplifier stages as an input signal and the output signal of that amplifier stage is supplied to the next amplifier stages as an input signal, and so on. Each amplifier stage outputs the input signal supplied thereto amplified with a stage amplification until the output signal reaches a stage limit level. This dynamics compressor has a logarithmic compression characteristic.

German OS 28 42 945 discloses a dynamics compressor that comprises an exponential compression characteristic.

The subsequent expansion becomes complicated given a logarithmic compression.

SUMMARY OF THE INVENTION

An object of the present invention is to provide a dynamics compressor with optimally low outlay, wherein the subsequent expansion is simpler to implement. This object is achieved in a dynamics compression of the type partially described wherein the magnitude of the curve of the sum signal above a minimal level roughly corresponds to an exponent characteristic of the magnitude of the analog signal.

The exponent of the exponent characteristic must, of course, be less than 1. It preferably lies between 0.2 and 0.5, particularly between 0.3 and 0.35. A value of one-third is quite specifically advantageous, i.e. when the exponent characteristic thus corresponds to a cube root.

Characteristics of this type are particularly advantageous because they proceed through the origin and are point-symmetrical. Both half-waves of a signal therefore are compressed to the same extent.

In practice, each exponent characteristic for arbitrarily small signals will have to be approximated by a straight line having a finite slope. Otherwise, an infinitely high amplification would have to be exerted in the proximity of the zero point. The minimal level therefore is defined by virtue of the transition from the linear region into the region of the exponent occurring at that level.

An exponent characteristic can be realized, for example, by the stage amplification of at least one of the amplifier stages differing from the stage amplifications of the other amplifier stages, and the stage limit levels of the amplifier stages being identical to one another.

Alternatively, it is possible for the stage limit level of at least one of the amplifier stages to differ from the stage limit levels of the other amplifier stages, for the stage amplifications of the amplifier stages to be identical to one another.

It is especially good for realizing the exponent characteristic for the stage limit levels of the amplifier stages to differ from one another in pairs. This is especially true when the stage limit levels monotonously decrease from the first to the last amplifier stage, particularly equidistantly.

It is generally true that the more amplifier stages employed the better the exponent characteristic can be approximated. Of course, the circuit-oriented outlay increases with the number of amplifier stages employed. A good compromise is for the dynamics compressor to have between four and ten, particularly between five and eight, amplifier stages, for example six amplifier stages.

The amplifier stages operate especially well when each of the amplifier stages has two steadily modulatable amplifier elements, each of which has one control terminal and two main terminals. Each of the amplifier elements has one of its main terminals connected via its own limiting resistor to a supply voltage and has the other main terminal connected via a constant current source to a reference potential. The input signal supplied to each amplifier stage is applied to the control terminals thereof and the signal output by each amplifier stage is taken between the main terminals and the limiting resistors.

When all of the limiting resistors exhibit the same value of resistance and the constant current sources of the amplifier stages output constant currents that differ from one another, then a relatively uniform structure of the individual amplifier stages is achieved.

Alternatively, it is possible that the limiting resistors of the amplifier stages exhibit values of resistance that differ from one another and all of the constant current sources of the amplifier stages output the same constant current.

When the input signal of the amplifier stages is symmetrically supplied thereto and when each of the amplifier stages symmetrically supplies its output signal to the summation stage, then even-numbered distortions are essentially suppressed.

When the summation stage is fashioned as a current node at its input side, then the summation of the output signals supplied by the individual amplifier stages is possible in an especially simple way. Dependent on the demands on the phase constancy between the analog signal and the sum signal, input resistors, low-pass filters or all-pass filters can be arranged between the summation stage and the amplifier circuits.

The inventive dynamics compressor is preferably employed for the compression of a magnetic resonance signal in a magnetic resonance coil.

DESCRIPTION OF THE DRAWINGS

FIG. 1 is a simplified illustration of a magnetic resonance reception part.

FIG. 2 is a block circuit diagram of a dynamics compressor in accordance with the invention.

FIG. 3 is a detailed circuit diagram of the dynamics compressor of FIG. 2.

DESCRIPTION OF THE PREFERRED EMBODIMENTS

According to FIG. 1, a reception coil 1 of a coil arrangement receives a magnetic resonance signal. The magnetic resonance signal is taken at a resonance capacitor 2 and is supplied to a dynamics compressor 4 via a pre-amplifier 3. The magnetic resonance signal, which is an analog signal, is compressed by means of the dynamics compressor 4. The dynamics compressor 4 thus outputs a sum signal (which is likewise analog) that has a range of dynamics that is reduced compared to the original magnetic resonance signal. Above a minimal level, the magnitude of the curve of the sum signal thus approximately corresponds to an exponent characteristic of the magnitude of the curve of the magnetic resonance signal. The exponent characteristic has an exponent whose value typically lies between 0.2 and 0.5. In particular, it usually lies between 0.3 and 0.35, for example at one-third.

The sum signal is then supplied to a modulator 5 with which the sum signal is modulated onto a high-frequency carrier signal. The output signal of the modulator is supplied to a transmission device 6 from which it is wirelessly communicated to a reception device 7 of a reception circuit.

From the reception device 7, the signal received by it is supplied to a demodulator 8 that regenerates the sum signal by demodulation. The sum signal is supplied to an analog-to-digital converter 9 that digitizes the analog sum signal. The digitized sum signal is supplied to an expander 10 that compensates the compression of the dynamics compressor 4. The expanded magnetic resonance signal that is reacquired in this way is forwarded for further processing to other units that are not shown for clarity.

The coil arrangement according to FIG. 1 is fashioned as a local coil. It thus represents a magnetic resonance coil that is not stationarily installed in a magnetic resonance apparatus but is movable relative thereto.

According to FIGS. 2 and 3, the dynamics compressor 4 has a number of series-connected amplifier stages 11. As a rule, between four and ten such amplifier stages 11 are present. The number preferably should amount to between five and eight. Six amplifier stages 11 are present according to the exemplary embodiment.

According to FIGS. 2 and 3, the magnetic resonance signal—also referred to as analog signal below—is supplied to the first of the amplifier stages 11 as an input signal. The output signal of the respectively preceding amplifier stage 11 is supplied to the other amplifier stages 11 as an input signal. Each amplifier stage 11 output the input signal supplied to it amplified with a stage amplification v until its output signal reaches a stage limit level $P_i$ (i=1, . . . , 6).

The analog signal and the output signals of the amplifier stages 11 are supplied to a summation stage 12. The summation in stage 12 sums the signals supplied to it and outputs a corresponding sum signal.

As already mentioned, an exponent characteristic is realized with the dynamics compressor 4. This can be achieved by various measures. For example, the stage limit levels $P_i$ of the amplifier stages 11 can be identical to one another but the stage amplifications v of the amplifier stages 11 can differ from one another. According to the exemplary embodiment, however, the stage amplifications v of the amplifier stages 11 can be identical to one another, whereas the stage limit levels $P_i$ of the amplifier stages 11 can differ from one another in pairs. In particular, the stage limit levels $P_i$ decrease monotonously in equidistant steps from the first to the last amplifier stage 11.

According to the exemplary embodiment, the following applies:

$$P_1 = P_6 + (1-i/6) \times D.$$

wherein D is the dynamics of the sum signal. The stage limit levels $P_i$ and the dynamics D are set as logarithmized quantities, for example in dB.

As a result of the above-described circuit, a maximum amplification V arises as a result as long as the analog signal lies below a minimal level. The maximum amplification V is equal to the product of the stage amplifications v, i.e. is equal to the $6^{th}$ power of the stage amplification v according to the exemplary embodiment. An amplification that decreases step-by-step occurs above the minimal level. The effective amplification as a function of the analog signal to be compressed can be easily calculated. The exponent then can be iteratively matched to the arising function. As a rule, the exponent is somewhat smaller than initially expected.

If the above-described procedure is inadequate, the stage limit levels $P_i$ can also be additionally varied as warranted such that they are no longer equidistant.

The limiting amplification stages 11 can be realized best with symmetrical differential amplifiers. Such differential amplifiers are also applied in many logarithmically compressing amplifiers. As shown in FIG. 3, each amplifier stage 11 has two amplifier elements 13. The amplifier elements 13 are usually transistors, each having a control terminal (base) and two main terminals (emitter and collector). The amplifier elements 13 can be steadily driven due to the employment of such transistors.

The collectors of the amplifier elements 13 are connected via their own limiting resistors 14 to a positive supply voltage U+. The emitters of the amplifier elements 13 are connected to a reference potential (ground) via negative feedback resistors 15 and a common constant current source 16. The respective input signal is symmetrically supplied to each amplifier stage 11 via coupling capacitors 17 or a coupling inductance 18. As can be seen, it is applied to the control terminals of the amplifier elements 13 of the respective amplifier stage 11. The output signals from the respective amplifier stage 11 can be taken between the collectors and the limiting resistors 14.

As can be seen, the summation stage 12 is also symmetrically supplied with the output signal of each of the amplifier stages 11. Disturbing, even-numbered disturbances of the signal as may be present are suppressed well as a result.

The small signal amplification v of the amplifier stages 11 is determined by the resistance values $R_C$, $R_E$ of the liming and negative feedback resistors 14, 15, by the current I of the constant current source 13, as well as by what is referred to as the temperature voltage $U_T$. The amplification v derives as $$v = R_C / (R_E + 2 \ U_T/I)$$

The small signal amplification v, which is identical to the stage amplification v, should exhibit the same value for all amplifier stages 11. This can be achieved, for example, in that the limiting resistors 14 of the amplifier stages 11 all exhibit the same resistance value $R_C$, the constant current sources 16 output constant currents I that differ from one another and the negative feedback resistors 15 are used in order to undertake the required parameterization of the amplifier stages 11. Alternatively, it is possible to vary the resistance value $R_C$ of the limiting resistors 14, to always set the same constant current I and to use the negative feedback resistors 15 in order to undertake the required parameterization of the amplifier stages 11. It is optionally possible to provide negative feedback resistors 15 at all amplifier stages 11. Alternatively, the amplifier stages 11 can be designed such that the last amplifier stage 11 has no negative feedback resistors 15.

As shown in FIG. 3, the inputs of the summations stage are the emitters of transistor 19 that are operated in base circuitry. The summation stage 12 is thus fashioned as a current node at its input side. The half-waves are thus added to one another with correct operational sign via the current mirror circuit of the summation stage 12 that is also shown in FIG. 3.

Instead of the illustrated transistor circuit for the summation stage 12, for example, an operational amplifier can also be alternatively employed, the inverting input thereof being supplied with the output signals.

As can be seen, the analog signal (i.e. the original input signal) and the output signals of the amplifier stages 11 are supplied to the summation stage 12 via all-pass filters 20. A good compensation of the stage-specific delay times of the output signals ensues by means of the all-pass filters 20. Given smaller phase errors, the all-pass filters 20 could be replaced with simple low-pass filters. When a compensation of phase distortions is not required, only resistors can even be employed.

The inventive dynamics compressor 4 shown in FIGS. 2 and 3 can be integrated without further difficulty into a local coil. It even has so slight a power consumption that it can be operated battery-supplied over a noteworthy time span.

Although modifications and changes may be suggested by those skilled in the art, it is the intention of the inventors to embody within the patent warranted hereon all changes and modifications as reasonably and properly come within the scope of their contribution to the art.

We claim as our invention:

1. A dynamics compressor for compressing dynamics of an analog signal, comprising:
    a plurality of successively connected amplifier stages each having an input and an output with the output of each amplifier stage being connected to the input of a next successive amplifier stage in said plurality, said plurality of amplifier stages including a first amplifier stage supplied with an analog signal having an amplitude and having dynamics to be suppressed at the input of said first amplifier stage;
    each of said amplifier stages amplifying a signal at the input thereof with a stage amplification to produce an amplified signal at the output thereof until said amplified signal at the output thereof reaches a stage limit level; and
    a summation stage supplied with said analog signal and the respective outputs of said amplifier stages, said summing stage summing said analog signal and the respective outputs to form a sum signal exhibiting a sum signal curve having a magnitude above a minimum level that, dependent on the respective stage amplifications and stage limit levels of said plurality of amplifier stages, approximates an exponent characteristic of said magnitude of said analog signal.

2. a dynamics compressor as claimed in claim 1 wherein said summation stage forms said sum signal with sum signal curve approximating an exponent, as said exponent characteristic having a value in a range between 0.2 and 0.5.

3. A dynamics compressor as claimed in claim 1 wherein said summation stage forms said form signal with said sum signal curve approximating an exponent, as said exponent characteristic, having a value in a range between about 0.3 and 0.35.

4. A dynamics compressor as claimed in claim 1 wherein said summation stage forms and said sum signal with said sum signal curve approximating an exponent, as said exponent characteristic, having a value of ⅓.

5. A dynamics compressor as claimed in claim 1 wherein at least one of said amplifier stages in said plurality has a stage amplification that differs from the respective stage amplifications of the other amplifier stages in said plurality, and wherein all of said amplifier stages in said plurality have chemical stage limit levels.

6. A dynamics compressor as claimed in claim 1 wherein at least one of said amplifier stages in said plurality has a stage limit limit that differs from the respective stage limit levels of the other amplifier stages in said plurality, and wherein all of said amplifier stages in said plurality have identical stage amplifications.

7. A dynamics compressor as claimed in claim 6 wherein said amplifier stages in said plurality have respective stage limit levels that differ from each other in pairs.

8. A dynamics compressor as claimed in claim 7 wherein said plurality of amplifier stages includes a last amplifier stage, and wherein said amplifier stages in said plurality have respective stage limit levels that decreases monotonously from said first amplifier stage to said last amplifier stage.

9. A dynamic compressor as claimed in claim 8 wherein said stage amplifiers have respective stage limit levels that differ by equal amounts from amplifier stage to amplifier stage.

10. A dynamic compressor as claimed in claim 1 wherein said plurality is in a range between 4 and 10.

11. A dynamic compressor as claimed in claim 1 wherein said plurality is in a range between 5 and 8.

12. A dynamic compressor as claimed in claim 1 wherein said plurality is 8.

13. A dynamic compressor as claimed in claim 1 for use with a supplied voltage referenced to a reference potential, and wherein each of said amplifier stages in said plurality comprises:
    a constant current source;
    two steadily drivable amplifier elements, each of said amplifier elements having one control terminal and first and second main terminals;
    two limiting resistors through which a respective first terminals of said two amplifier elements are connected to said supplied voltage;
    the respective second main terminals of said two amplifier elements being connected via said constant current source to said reference potential;
    the respective control terminals of said two amplifier elements forming the input for that amplified stage; and
    two said taps, forming the output for that amplifier stage, respectively said limiting resistors and the respective first main terminals of the two amplifier elements.

14. A dynamic compressor as claimed in claim 13 wherein all of said limiting resistors in all of said amplifier stages in said plurality have equal resistance values, and wherein the respective constant current resources in the amplifier stages emit respective constant currents that differ from each other.

15. A dynamic compressor as claimed in claim 13 wherein the limiting resistor in the respective amplifier stages have resistance values that differ from amplifier stage to amplifier stage, and wherein the respective constant current sources in all of said amplifier stages emit respective constant currents that are equal.

16. A dynamic compressor as claimed in claim 13 wherein at least some of said amplifier stages in said plurality further comprises respective negative feedback resistors connected between the second main terminals of the two amplifier elements thereof and the constant current source thereof.

17. A dynamic compressor as claimed in claim 16 wherein said plurality of amplifier stages includes a last amplifier stage, and wherein said last amplifier stage contains no negative feedback resistors.

18. A dynamic compressor as claimed in claim 13 wherein each of said amplifier stages receives an input signal at the input thereof symmetrically supplied to the respective control terminals of the two amplifier elements, and wherein each of said amplifier stages symmetrically supplies an output signal to said summation stage.

19. A dynamic compressor as compressor as claimed in claim 1 wherein said summation stage has a current node at an input side thereof.

20. A dynamic compressor as claimed in claim 19 further comprising a plurality of input resistors respectively connected between said summation stage and the respective outputs of said amplifier stages.

21. A dynamics compressor as claimed in claim 19 further comprising a plurality of low-pass filters respectively connected between said summation stage and the respective outputs of said amplifier stages.

22. A dynamics compressor as claimed in claim 19 further comprising a plurality of all-pass filters respectively connected between said summation stage and the respective outputs of said amplifier stages.

23. A dynamic compressor as claimed in claim 1 further comprising a transmission device connected to said summation stage adapted to wirelessly transmit said sum signal to a reception device located remotely from said transmission device.

24. A dynamics compressor as claimed in claim 1 further comprising a magnetic resonance coil of a magnetic resonance examination apparatus connected to the input of said first amplifier stage, said magnetic resonance coil producing said analog stage.

25. A dynamics compressor as claimed in claim 24 wherein said magnetic resonance coil is a local coil.

* * * * *